US008616510B2

(12) United States Patent
Zarelius

(10) Patent No.: US 8,616,510 B2
(45) Date of Patent: Dec. 31, 2013

(54) COLLAPSIBLE, FLEXIBLE DISPLAY SYSTEM

(71) Applicant: Expand International AB, Johanneshov (SE)

(72) Inventor: Christer Zarelius, Stockholm (SE)

(73) Assignee: Expand International AB, Johanneshov (SE)

( * ) Notice: Subject to any disclaimer, the term of this patent is extended or adjusted under 35 U.S.C. 154(b) by 0 days.

(21) Appl. No.: 13/667,602

(22) Filed: Nov. 2, 2012

(65) Prior Publication Data
US 2013/0112820 A1 May 9, 2013

Related U.S. Application Data

(63) Continuation-in-part of application No. PCT/SE2012/050143, filed on Feb. 13, 2012.

(60) Provisional application No. 61/447,521, filed on Feb. 28, 2011.

(30) Foreign Application Priority Data

Feb. 25, 2011 (SE) ...................................... 1100134

(51) Int. Cl.
E04G 25/00 (2006.01)
(52) U.S. Cl.
USPC ............................ 248/200.1; 40/610; 160/135
(58) Field of Classification Search
USPC .............. 248/165, 200.1, 206.5; 40/600, 605, 40/610, 661.01; 160/24, 120, 135, 180, 160/263, 349.1; 427/128; 428/151, 156, 428/220, 692, 900
See application file for complete search history.

(56) References Cited

U.S. PATENT DOCUMENTS

| 3,605,851 | A * | 9/1971 | Miles ............................ 160/135 |
| 3,827,019 | A * | 7/1974 | Serbu ............................ 335/285 |
| 6,681,532 | B1 * | 1/2004 | Palmbos et al. ................... 52/71 |
| 6,836,988 | B2 * | 1/2005 | Zarelius .......................... 40/610 |
| 7,237,350 | B1 * | 7/2007 | Zarelius .......................... 40/610 |
| 8,272,156 | B2 * | 9/2012 | Gimpel et al. .................. 40/604 |
| 2005/0166430 | A1 | 8/2005 | Zarelius |

FOREIGN PATENT DOCUMENTS

SE 469 404 B 6/1993
SE 529 576 C2 9/2007

* cited by examiner

Primary Examiner — Gwendolyn Baxter
(74) Attorney, Agent, or Firm — Drinker Biddle & Reath LLP

(57) ABSTRACT

A collapsible, flexible display system for creating different spatial shapes of a continuous screen includes at least two stands, each including a first part which support against an underlying supportive surface and a pole with a first end removably secured in the first part by a coupling. The display system also includes essentially hollow, straight members of a rigid material including end parts, and essentially hollow, bendable members of a flexible material including end parts. Each end part includes either a male part, or a female part, at least one of them of a magnetic material, and operable to magnetically fasten to each other. Straight members and bendable members are connected to form an upper part and a lower part. The display system is mounted with the upper part fastened in a number, n, of first couplings, and the lower part fastened in the number, n, of second couplings.

22 Claims, 7 Drawing Sheets

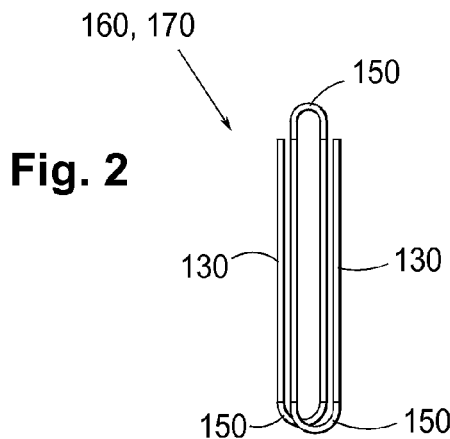
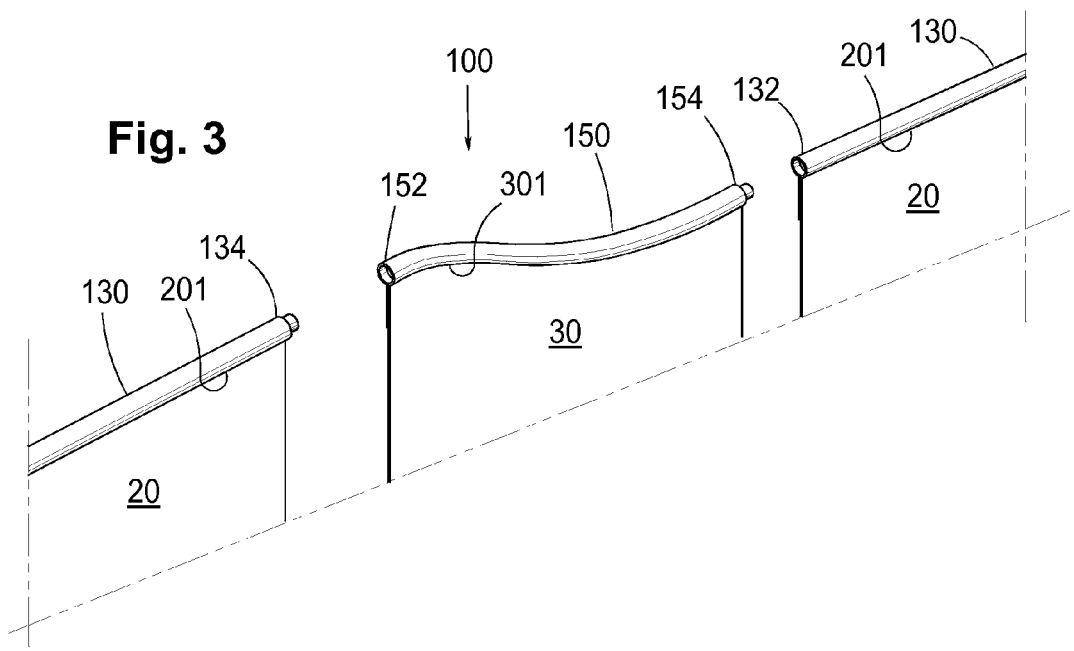

COLLAPSIBLE, FLEXIBLE DISPLAY SYSTEM

CROSS REFERENCE TO RELATED APPLICATIONS

This application is a Continuation-In-Part Application of copending prior International Application No. PCT/SE2012/050143, filed Feb. 13, 2012, which claims priority to Swedish Application No. 1100134-4, filed Feb. 25, 2011 and U.S. Provisional Application No. 61/447,521, filed Feb. 28, 2011, all of which are herein incorporated by reference in their entirety.

FIELD OF THE INVENTION

The present invention relates according to a first aspect to a collapsible, flexible display system.

According to a second aspect the present invention relates to an alternative collapsible, flexible display system.

BACKGROUND OF THE INVENTION

The patent document SE 529 576 C2 relates to a display system which uses a magnetic coupling or a screw/thread coupling in order to connect different tubes horizontally. The display system uses metal tubes which only can be connected in a radial plane with the aid of guide traces in the coupling area. The display system uses both straight and curved tubes, but they are both of a rigid material, in order to create curved shapes for suspending a screen.

A main disadvantage with this solution is that it is difficult to assemble in that it comprises a lot of different parts. It is especially difficult for one person to assemble a display system according to the above presented solution. Furthermore, the display system according this solution can only have predetermined shapes. Another advantage is that the display system will be rather heavy due to all metal tubes.

SUMMARY OF THE INVENTION

The above mentioned problems are solved with a collapsible, flexible display system as described below. The display system is operable to create different spatial shapes of a continuous screen. The display system comprising at least two stands, each stand comprising a first part which support against an underlying supportive surface, wherein the stand also comprises a pole means, with a first end removably secured in the first part, and a second end provided with a first coupling means. The display system also comprises essentially hollow, straight members of a rigid material, each member comprises a first end part, and a second end part, and at least one essentially hollow, at least partly bendable member of a flexible material, each member comprises a first end part, and a second end part. Each end part comprises either a male part, or a female part, at least one of them of a magnetic material, and operable to magnetically fasten to each other. Different members are connected to each other in order to form an upper part, and a lower part, both comprising the same type of members. If an end part of an at least partly bendable member comprises a female part, or a male part of a magnetic material, the end part comprises a sleeve means arranged between the end part, and the female part, or the male part. The screen comprises an upper edge welt, and a lower edge welt adapted to receive the upper part respectively the lower part. Each pole means is provided with a second coupling means arranged in connection to the first end. When the display system is mounted, the upper edge welt comprising the upper part are fastened in a number, n, of first coupling means, and the lower edge welt comprising the lower part are fastened in the number, n, of the second coupling means.

A main advantage with this solution is that it is very easy to assemble the display system. It is even possible for only one person to assemble the display system without having to use a ladder. Another very important advantage is that this solution offers more freedom in creating different spatial shapes of a continuous screen. Another advantage is that it is possible to decrease the weight of the display system, which is of importance when transporting a disassembled display system.

The above mentioned problems are also solved with a collapsible, flexible display system as described below. The display system is operable to create different spatial shapes of a continuous screen. The display system comprises at least two stands, each stand comprising a first part which support against an underlying supportive surface, wherein the stand also comprises a pole means, with a first end removably secured in the first part, and a second end provided with a first coupling means. The display system comprises at least two essentially rectangular first screens, each first screen comprising two essentially hollow, straight members of a rigid material, one arranged in connection with a first short end of the first screen, and the other arranged in connection with a second short end of the first screen. Each member comprises a first end part, and a second end part. Each first screen comprises a first magnetic strip means arranged in connection with a first longitudinal end of the first screen, and a second magnetic strip means arranged in connection with a second longitudinal end of the first screen. Furthermore, the display system also comprises at least one essentially rectangular second screen, each second screen comprises two essentially hollow, at least partly bendable members of a flexible material, one arranged in connection with a first short end of the second screen, and the other arranged in connection with a second short end of the second screen. Each member comprises a first end part, and a second end part. Each second screen comprises a first magnetic strip means arranged in connection with a first longitudinal end of the second screen, and a second magnetic strip means arranged in connection with a second longitudinal end of the second screen. Each end part comprises either a male part, or a female part, at least one of them of a magnetic material. The different screens are connected to each other by the members being connected to each other magnetically, and the magnetic strip means being connected to each other magnetically. The members are connected to the first coupling means, and to second coupling means arranged in connection to the first end of each pole means, thus creating a continuous screen.

A main advantage with this solution is that it is very easy to assemble the display system. It is even possible for only one person to assemble the display system without having to use a ladder. Another very important advantage is that this solution offers more freedom in creating different spatial shapes of a continuous screen. Another advantage is that it is possible to decrease the weight of the display system, which is of importance when transporting a disassembled display system.

A further advantage in this context is achieved if at least one of the at least partly bendable members has the first end part, and the second end part provided with a female part, at least one of them being of magnetic material. This embodiment also covers abutting female parts of different partly bendable members connected by a coupling member. Both these female parts can have magnetic connecting members attached.

Furthermore, it is an advantage in this context if at least one of the at least partly bendable members has the first end part provided with a female part, and the second end part provided with a male part, wherein at least one of the female part and the male part being of magnetic material.

A further advantage in this context is achieved if at least one of the at least partly bendable members has the first end part, and the second end part provided with a male part, at least one of them being of magnetic material.

Furthermore, it is an advantage in this context if at least one of the at least partly bendable members have at least one spring means arranged in connection to the male part and/or female part, inside the bendable member.

A further advantage in this context is achieved if at least one of the straight members has the first end, and the second end provided with a female part, at least one of them being of a ferromagnetic material.

Furthermore, it is an advantage in this context if at least one of the straight members has the first end part provided with a female part, and the second end part provided with a male part, wherein at least one of the female part and the male part being of a ferromagnetic material.

A further advantage in this context is achieved if at least one of the straight members has the first end part, and the second end part provided with a male part, at least one of them being of ferromagnetic material.

Furthermore, it is an advantage in this context if each of the at least partly bendable members is made of rubber.

A further advantage is that at least one of said at least partly bendable members is provided with a stiff part in combination with at least one bendable end part. One embodiment is a partly bendable member having a first stiff end part and a second bendable end part. This first stiff end part can either be arranged at the end of the partly bendable member having the rest as well as the central part thereof made bendable or be arranged from the end and also containing the central part of the member so that only the opposite end part is bendable.

A further advantage is that at least one of said at least partly bendable members is provided with a central stiff part and with a first bendable end part and with a second bendable end part. In this context "stiff" means a material having an elastic modulus $E_s$, where $E_s > 10$ GPa, preferably $E_s > 50$ GPa. Furthermore in this context "bendable" means a material having an elastic modulus $E_b < 5$ GPa or a plastic deformation of a solid body.

A further advantage is that the whole length of the at least partly bendable member is made of a flexible material, preferably rubber, having a stiffening device attached to the central part thereof. Thus the stiffening device is attached to the flexible member either on the inside or at the outside of the bendable member.

A further advantage is that the stiffening device is mounted inside the central part of the bendable member, preferably arranged as a metal member, for example in the form of an aluminum tube, Such an aluminum tube can be entered axially from the end of a tubular bendable member and be fixed inside by pressure forces or by gluing.

A further advantage is that the stiffening device is mounted outside the central part of the bendable member, preferably arranged as an outside mounted stiffening profile. Such a profile might be in an L-form of to which a handle cooperating with a hook is attached.

A further advantage is that the central stiff part is arranged as a stiff profile, preferably of metal, one end of which is connected to a first end member and the other end of which is connected to a second end member where both said end members are bendable. In such an embodiment the stiff central part is connected to bendable end parts by means of some kind of connection member.

A further advantage is that the connection between each end member and the central stiff part is arranged as an axially inserted linking member, preferably fixed with glue inside said members.

A further advantage is that each of said end members is made of rubber.

A further advantage is that said central stiff part is made of aluminum.

A further advantage in this context is achieved if each of the straight members is made of aluminum.

Furthermore, it is an advantage in this context if the members have a circular cross section.

According to another alternative, it is an advantage if the members have an elliptical cross section.

It will be noted that the term "comprises/comprising" as used in this description is intended to denote the presence of a given characteristic, step, or component, without excluding the presence of one or more other characteristics, features, integers, steps, components, or groups thereof.

Embodiments of the invention will now be described with a reference to the accompanying drawings, in which:

BRIEF DESCRIPTION OF THE DRAWINGS

FIG. 2 discloses a perspective view of an upper part, and a lower part of the display system disclosed in FIG. 1;

FIG. 3 discloses a perspective view of the assembling of a second embodiment of a collapsible, flexible display system according to the present invention showing a first embodiment of an at least partly bendable member;

DETAILED DESCRIPTION OF PREFERRED EMBODIMENTS

Figure 1:
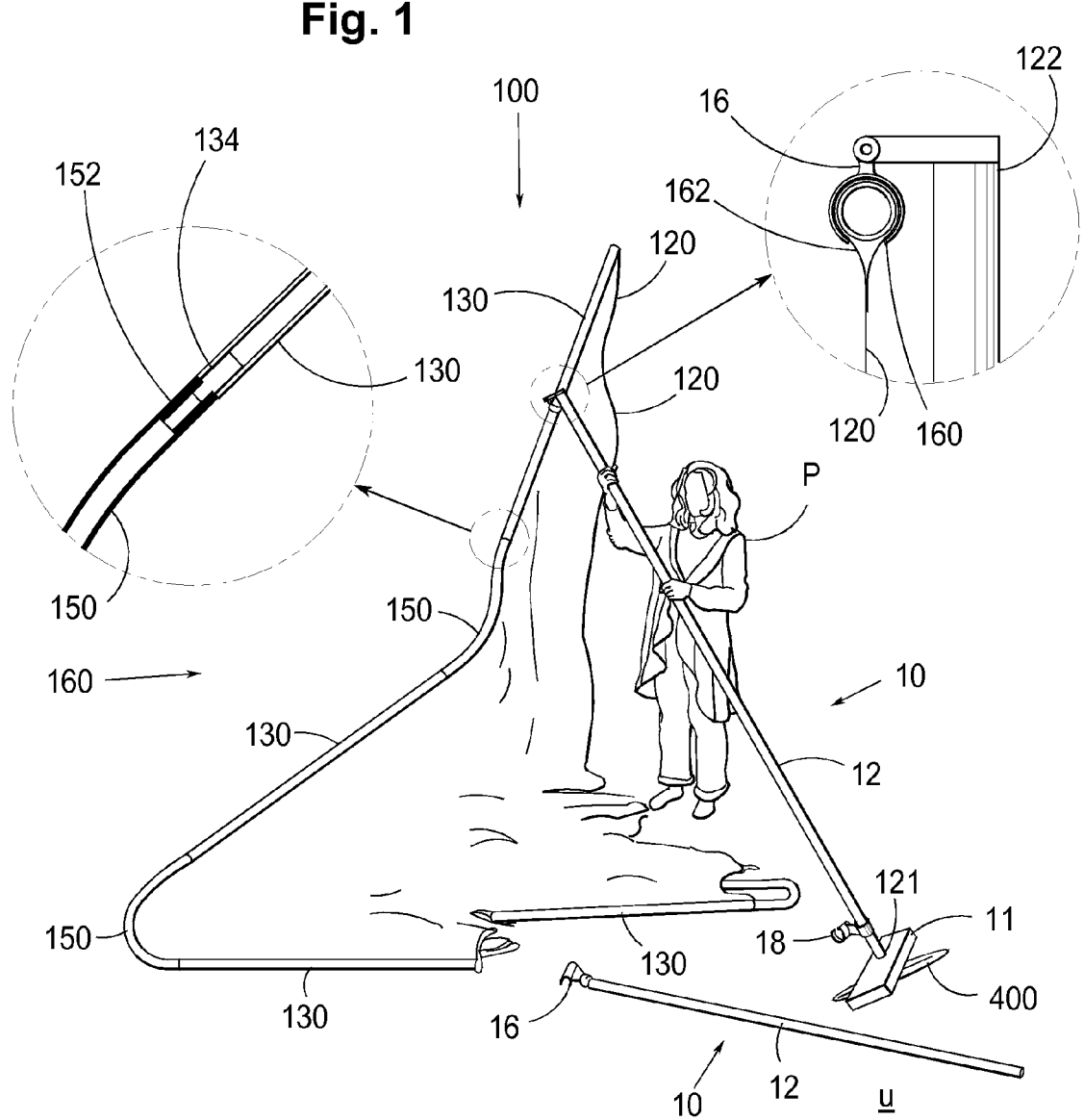
FIG. 1 discloses a perspective view of the assembling of a first embodiment of a collapsible, flexible display system according to the present invention.

In FIG. 1 there is disclosed a perspective view of the assembling of a first embodiment of a collapsible, flexible display system 100 according to the present invention. The display system 100 comprises at least two stands 10, each stand 10 comprising a first part 11 which support against an underlying supportive surface (u). Furthermore, the stand 10 also comprises a pole means 12, with a first end 121 removably secured in the first part 11, and a second end 122 provided with a first coupling means 16. As is apparent in FIG. 1, one stand 10 has been used for assembling the display system 100 so far, while the other disclosed stand 10 is lying on the surface (u), e.g., the floor. In order to increase the stability of the display system 100, the first part 11 can be provided with two feet 400, as is apparent in FIG. 1. The display system 100 also comprises essentially hollow, straight members 130 of a rigid material, e.g., aluminum. Each member 130 comprises a first end part 132 (not disclosed in FIG. 1), and a second end part 134. Furthermore, the display system 100 also comprises essentially hollow, bendable members 150 of a flexible material, e.g., rubber. Each end part 132, 134, 152, 154 comprises either a male part, or a female part, at least one of them of a magnetic material, and operable to magnetically fasten to each other. This is partly disclosed in the cross section view disclosed in the circle to the left in FIG. 1. As is disclosed in this cross section view, the first end part 152 of the bendable member 150 comprises a female part of magnetic material, and the second end part 134 of the straight member 130 comprises a male part of ferromagnetic material. The different members 130, 150 are connected to each other in order to form an upper part 160, and a lower part 170 (not disclosed in FIG. 1), both comprising the same type of members 130, 150, and in the same order. It is pointed out that a bendable member 150 is always placed between two straight members 130. If an end part 152, 154 of a bendable member 150 comprises a female part, or a male part of a magnetic material, the end part 152, 154 comprises a sleeve means 156 (not disclosed in FIG. 1, but see e.g., FIG. 6) arranged between the end part 152, 154 and the female part, or the male part. It is pointed out that the display system 100 is operable to create different spatial shapes of a continuous screen 120. The screen 120 comprises an upper edge welt 162, and a lower edge welt (not disclosed in FIG. 1) adapted to receive the upper part 160 respectively the lower part 170. The upper edge welt 162 is disclosed in the circle to the right in FIG. 1. As also is apparent in FIG. 1, each pole means 12 is provided with a second coupling means 18 arranged in connection to the first end 121. When the display system 100 is mounted/assembled, the upper part 160 is placed in the upper edge welt 162, and thereafter fastened in a number, n, of first coupling means 16. The person P in FIG. 1 is performing this mounting step. The lower edge welt comprising the lower part 170 are fastened in the number, n, of the second coupling means 18. It is pointed out that it is possible for only one person P to assemble the display system 100 according to the present invention, without having to use a ladder. It is pointed out that it is suitable to have a stand 10 for each straight member 130 in order to make the display system 100 stable.

In FIG. 2 there is disclosed a perspective view of an upper part 160, or a lower part 170 of the display system 100 disclosed in FIG. 1. Due to the fact that the members 150 are bendable it is possible to have the upper part 160, or the lower part 170 mounted and suitable for transport in e.g., a bag. Furthermore, when the upper part 160 is arranged in the disclosed way, it will not occupy much space.

In FIG. 3 there is disclosed a perspective view of the assembling of a second embodiment of a collapsible, flexible display system 100 according to the present invention. The display system 100 comprises at least two essentially rectangular first screens 20, and at least one essentially rectangular second screen 30. Each first screen 20 comprises two essentially hollow, straight members 130 of a rigid material, one arranged in connection with a first short end 201 of the first screen 20, and the other arranged in connection with a second short end 203 (not disclosed in FIG. 3, but in FIG. 4) of the first screen 20. Each second screen 30 comprises two essentially hollow, bendable members 150 of a flexible material, one arranged in connection with a first short end 301 of the second screen 30, and the other arranged in connection with a second short end 303 (not disclosed in FIG. 3, but in FIG. 4) of the second screen 30. It is pointed out that in this particular embodiment, the members 130, 150 are fixedly connected to the screens 20, 30. Each member 130 comprises a first end part 132, and a second end part 134, and each member 150 comprises a first end part 152, and a second end part 154. Each end part 132, 134, 152, 154 comprises either a male part, or a female part, at least one of them of a magnetic material. The different screens 20, 30 are connected to each other by the members 130, 150 being connected to each other magnetically.

Figure 4:
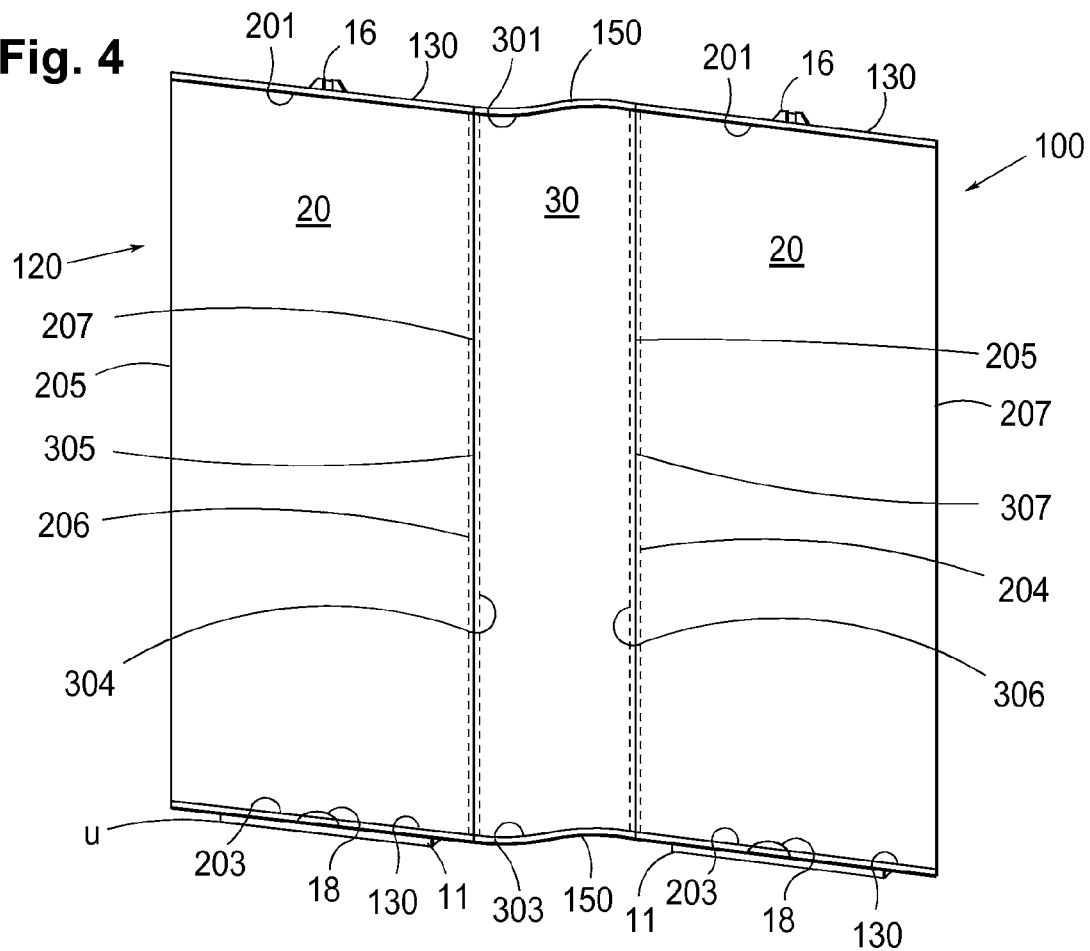
FIG. 4 discloses a side view of the display system disclosed in FIG. 3, when it has been assembled.

In FIG. 4 there is disclosed a side view of the display system 100 disclosed in FIG. 3, when it has been assembled. Each first screen 20 comprises a first magnetic strip means 204 arranged in connection with a first longitudinal end 205 of the first screen 20, and a second magnetic strip means 206 arranged in connection with a second longitudinal end 207 of the first screen 20. Each second screen 30 comprises a first magnetic strip means 304 arranged in connection with a first longitudinal end 305 of the second screen 30, and a second magnetic strip means 306 arranged in connection with a second longitudinal end 307 of the second screen 30. Besides that the male parts and female parts of the members 130, 150 are connected to each other magnetically, the magnetic strip means 204, 206, 304, 306 are connected to each other magnetically, as is disclosed in FIG. 4. Furthermore, the display system 100 also comprises at least two stands 10 (see FIG. 1), each stand 10 comprising a first part 11 in the same way as disclosed and described in connection with FIG. 1. Each member 130 is coupled to a first coupling means 16, here disclosed in the form of a hook means 16, but the coupling means 16 can be of the type disclosed in FIG. 1. Furthermore, each member 130 is coupled to a second coupling means 18 arranged in connection to the first end 121 of each pole means 12 (see e.g., FIG. 1), creating a continuous screen 120.

Figure 5:
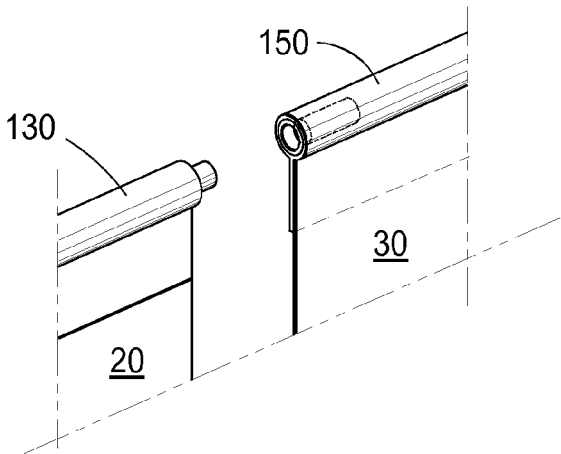
FIG. 5 discloses a perspective view in more detail of some parts of the display system disclosed in FIG. 4.
Figure 6:
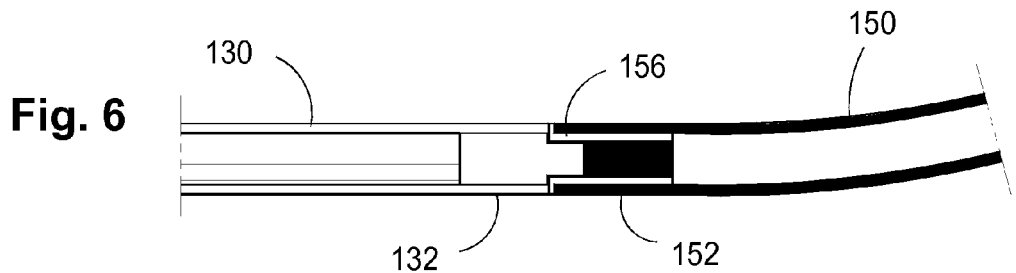
FIG. 6 is a cross section view of the parts disclosed in FIG. 5, when they have been connected.

In FIGS. 5, and 6 there is disclosed a perspective view in more detail and a cross section view of some parts of the display system 100 disclosed in FIG. 4. In FIG. 5 there is disclosed a first screen 20 with a straight member 130, and a second screen 30 with a bendable member 150. In this particular embodiment, the first end part 132 (see FIG. 6) comprises a male part of a ferromagnetic material, e.g. steel. The first end part 152 of the bendable member 150 comprises a female part of a magnetic material. Furthermore, as is apparent in FIG. 6, the first end part 152 also comprises a sleeve means 156 arranged between the first end part 152, and the female part. This makes the connection stronger. The arrow in FIG. 6 illustrates that the member 150 is bendable.

Figure 7:
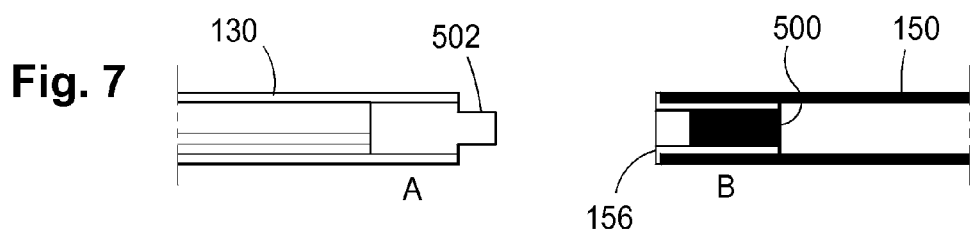
FIG. 7 is a cross section view of the parts disclosed in FIG. 6, before they have been connected.

In FIG. 7 there is disclosed a cross section view of the parts disclosed in FIG. 6, before they have been connected. In this case the female part has been assigned the reference sign 500, and the male part has been assigned the reference sign 502.

Figure 8:
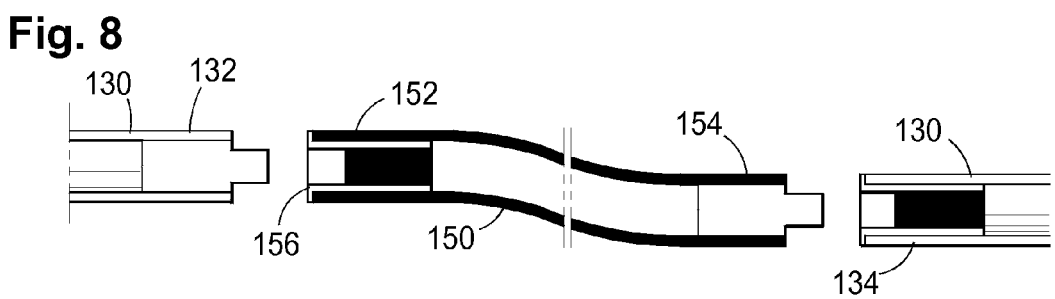
FIG. 8 is a cross section view of a first alternative of parts involved in assembling the display system disclosed in FIG. 1, or FIG. 4.

In FIG. 8 there is disclosed a cross section view of a first alternative of some parts involved in assembling the display system 100 disclosed in FIG. 1, or FIG. 4. Here are disclosed two straight members 130, and one bendable member 150. The first end part 152 of the bendable member 150 comprises a female part of a magnetic material. The second end part 154 of the bendable member 150 comprises a male part of a ferromagnetic material. To be connected to the bendable member 150 is on the one hand the straight member 130 with a male part of a ferromagnetic material arranged in the first end part 132, and on the other hand the straight member 130 with a female part of magnetic material arranged in the second end part 134.

Figure 9:
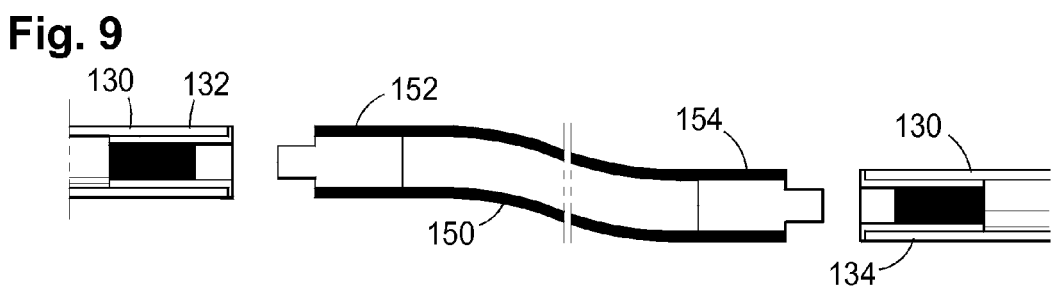
FIG. 9 is a cross section view of a second alternative of parts involved in assembling the display system disclosed in FIG. 1, or FIG. 4.

In FIG. 9 there is disclosed a cross section view of a second alternative of some parts involved in assembling the display system 100 disclosed in FIG. 1, or FIG. 4. Here are disclosed two straight members 130, and one bendable member 150. In this particular embodiment, both the first and second end parts 152, 154 of the bendable member 150 comprise a male part of a ferromagnetic material. To be connected to the bendable member 150 is on the one hand the straight member 130 with a female part of a magnetic material arranged in the first end part 132, and on the other hand the straight member 130 with a female part of a magnetic material arranged in the second end part 134.

Figure 10:
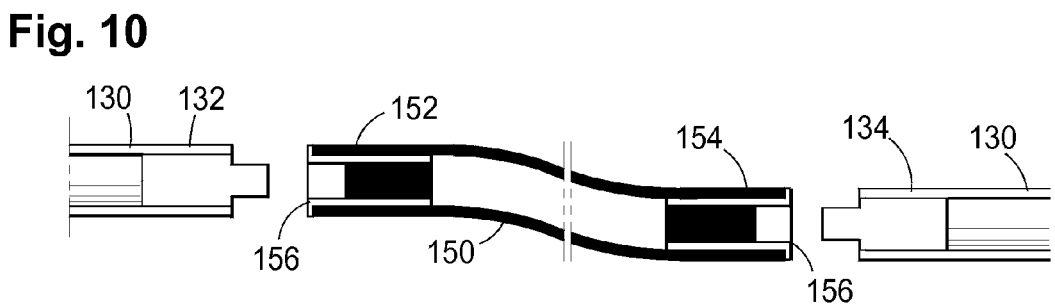
FIG. 10 is a cross section view of a third alternative of parts involved in assembling the display system disclosed in FIG. 1, or FIG. 4.

In FIG. 10 there is disclosed a cross section view of a third alternative of some parts involved in assembling the display system 100 disclosed in FIG. 1, or FIG. 4. Here are disclosed two straight members 130, and one bendable member 150. In this particular embodiment, both the first and second parts 152, 154 of the bendable member 150 comprise a female part of a magnetic material. To be connected to the bendable member 150 is on the one hand the straight member 130 with a male part of a ferromagnetic material arranged in the first end part 132, and on the other hand the straight member 130 with a male part of a ferromagnetic material arranged in the second part 134.

Figure 11:
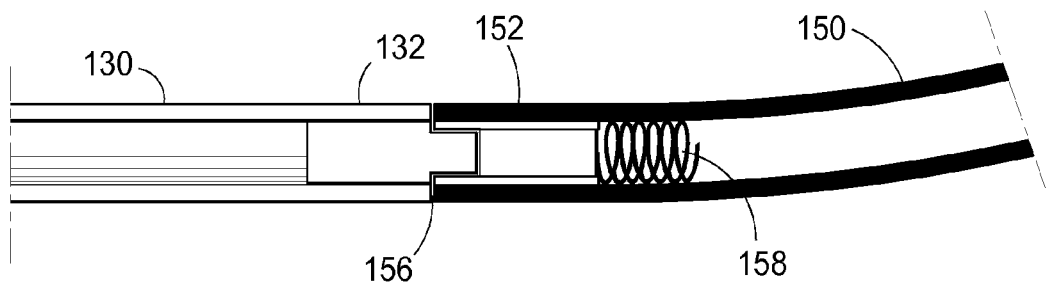
FIG. 11 is a cross section view of an alternative to the parts disclosed in FIG. 6.

In FIG. 11 there is disclosed a cross section view of an alternative to the parts disclosed in FIG. 6. Here is disclosed a bendable member 150 with a female part of a magnetic material arranged in the first end part 152, and also provided with the sleeve means 156. The bendable member 150 is connected to the straight member 130 by means of a male part of a ferromagnetic material arranged in the first end part 132. In this particular embodiment, a spring means 158 is arranged in the bendable member 150, in connection to/connected to the female part. It is pointed out that the spring means 158 also can be connected to the sleeve means 156. With this spring means 158 it is possible to achieve a curvature that is smoother. It can also be of help if the material of the bendable member 150 is too limp.

Figure 12:
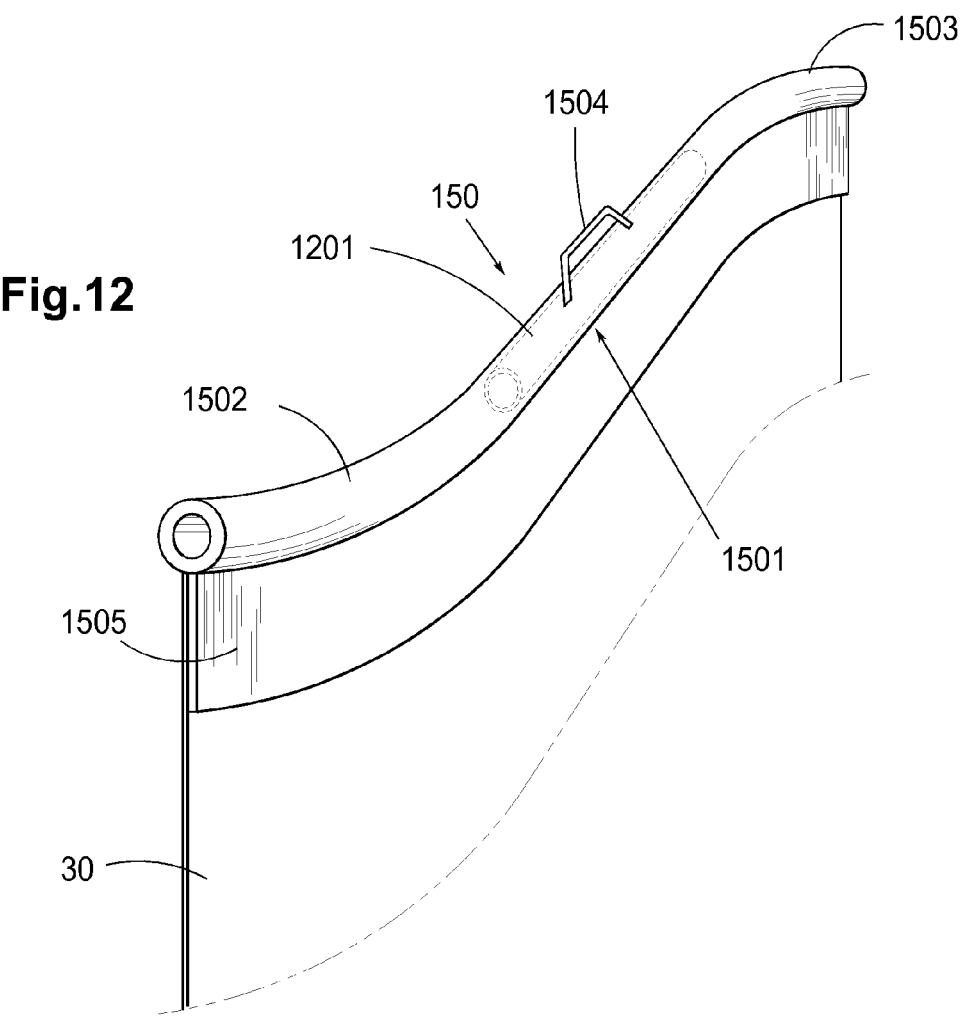
FIG. 12 discloses a perspective view of a second embodiment of an at least partly bendable member as a part of a flexible display system according to the present invention.

In FIG. 12 there is disclosed a perspective view of a second embodiment of a partly bendable member 150. The partly bendable member 150 is provided with a central stiff part 1501 and with a first bendable end part 1502 and with a second bendable end part 1503. The partly bendable member 150 is made of a flexible hollow rubber profile in which a stiffening member 1201 such as an aluminum tub is inserted to define the central stiff part 1501 in this embodiment. Other materials than aluminum can be used for the stiffening member in the central part of the rubber profile, such as brass, copper or an armed polymer. The central part 1501 is also provided with a first coupling means, here disclosed in the form of a suspension bracket 1504, but the coupling means can be of the types disclosed in FIG. 1 and FIG. 4 as well. The suspension bracket 1504 is attached to the stiffening member 1201 through holes in the hollow rubber profile. The outer surface of the flexible hollow rubber profile is provided with an attachment extension 1505 having at least one flat side to which the second screen 30 is attached, preferably by an adhesive. Thus, the partly bendable member 150 in this embodiment consists of flexible end parts and a straight stiff central part symmetrically located in the partly bendable member 150.

Figure 13:
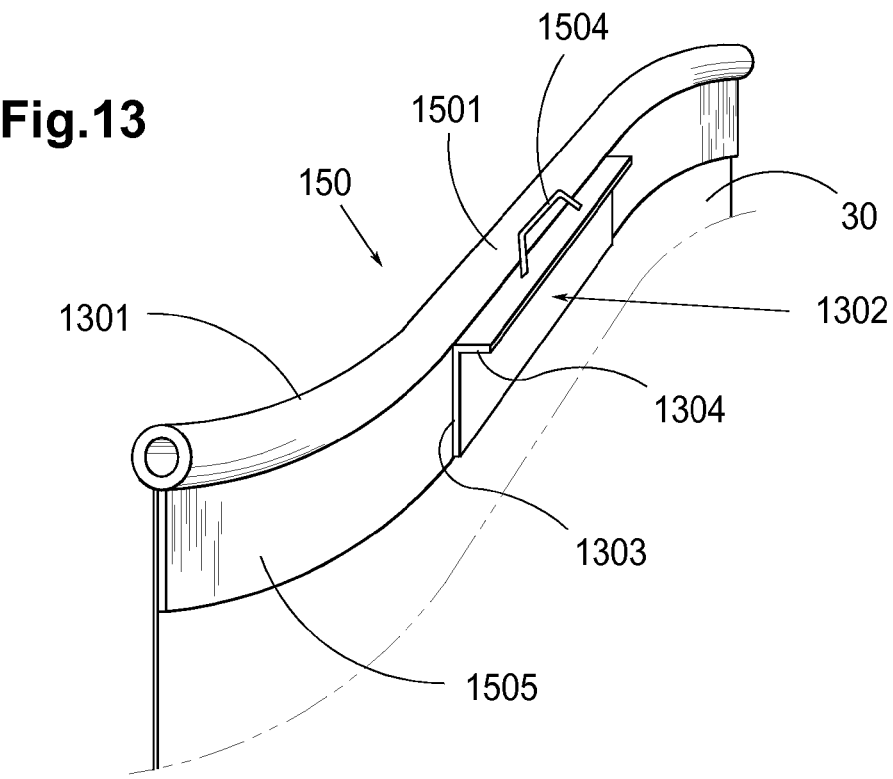
FIG. 13 discloses a perspective view of a third embodiment of an at least partly bendable member as a part of a flexible display system according to the present invention.

In FIG. 13 there is disclosed a perspective view of a third embodiment of a partly bendable member 150. The partly bendable member 150 in this embodiment is designed identically as described in FIG. 12 in that it is made of a flexible hollow rubber profile 1301 with an attachment extension 1505 to which the second screen 30 is attached. Also to this attachment extension 1505 a stiffening member 1302 is attached in order to define the central stiff part 1501 of this embodiment. The stiffening member 1302 is designed as a L-shaped profile having a long flange 1303 fixed to the attachment extension 1505 and a short flange 1304 directed out from the rubber profile 1301. Centrally to this short flange 1304 a suspension bracket 1504 as a first coupling means is attached.

Figure 14:
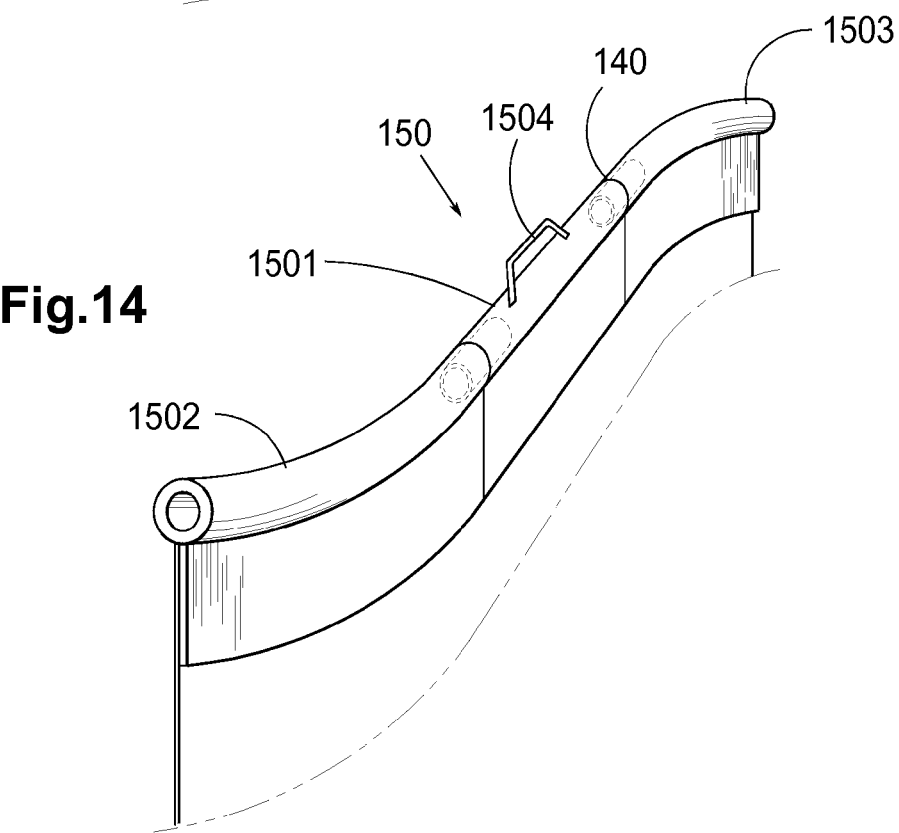
FIG. 14 discloses a perspective view of a fourth embodiment of an at least partly bendable member as a part of a flexible display system according to the present invention.

In FIG. 14 there is disclosed a perspective view of a fourth embodiment of a partly bendable member 150. In this embodiment a central stiff part 1501 in the form of a hollow profile, preferably of metal, is attached to a first bendable end part 1502 and to a second bendable end part 1503. These bendable end parts are designed as hollow flexible profiles, preferably made of rubber, and having the same form as previously presented in FIGS. 12 and 13 and the same cross section as the central stiff part. Each end part 1502, 1503 is connected to the central stiff part 1501 by the means of a connection link 140 inserted into the respective end part either as a pin fixed with the central stiff part or as a separate pin inserted both into the central stiff part and into the respective end part and attached to these parts by an adhesive. Also a first coupling means, disclosed in the form of a suspension bracket 1504, is mounted on the central stiff part 1501.

Figure 15:
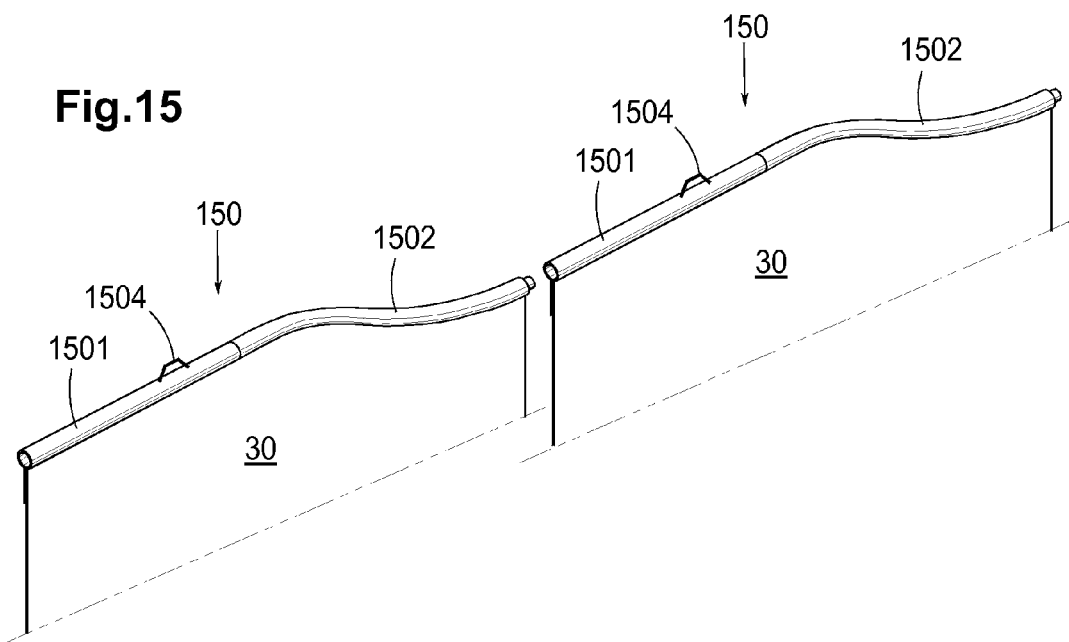
FIG. 15 discloses a perspective view of a fifth embodiment of an at least partly bendable member as a part of a flexible display system according to the present invention.

In FIG. 15 there is disclosed a perspective view of a fifth embodiment of two partly bendable members 150. In this embodiment a stiff part 1501 in the form of a hollow profile, preferably of metal, is attached to a bendable end part 1502. This bendable end part is designed as a hollow flexible profile, preferably made of rubber, and having the same form as previously presented. The stiff part 1501 is arranged as one end of the partly bendable members and is also containing the central part of the member and is connected to the opposite bendable end part 1502. Also a first coupling means, disclosed in the form of a suspension bracket 1504, is mounted centrally on the partly bendable member 150 and on the stiff part 1501 thereof. As previously disclosed a screen 30 is attached to each of the partly bendable member 150. This embodiment makes it possible to connect two identical partly bendable members to each other by attaching the bendable end part 1502 to the stiff part 1501 as indicated in FIG. 15.

Figure 16:
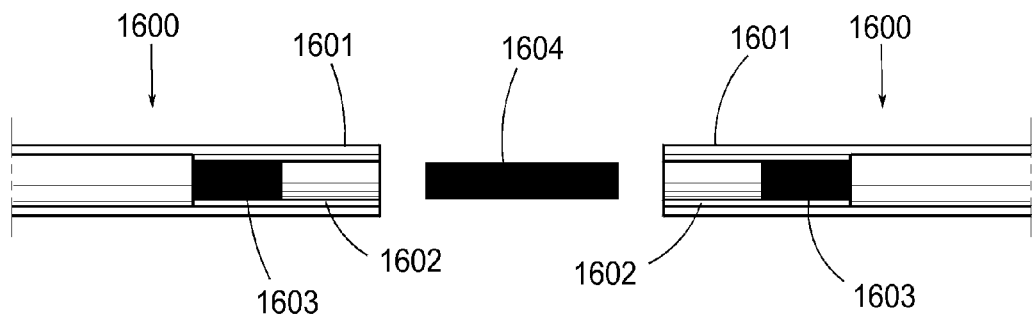
FIG. 16 is a cross section view of a connection between two tubular members according to the present invention.

In FIG. 16 there is disclosed a cross section view of an embodiment for connecting two tubular members 1600 each of which can be designed as any of the previously described straight, bendable or partly bendable members. Each member 1600 is in at least one end of the member provided with a female part 1601 having on the inside a coupling sleeve 1602 provided with a bottom member 1603. A male part having an outer size corresponding to an inner size of the female parts is provided as a coupling member 1604. Preferably the bottom member 1603 cooperates with the coupling member 1604 magnetically.

Each of the partly bendable members 150 is designed in their ends in the same way as the previously described bendable members and can be attached to either a straight member 130 or another bendable or partly bendable member 150 designed in the respective ends I any way as previously described.

It is pointed out that the disclosed connections of different members 130, 150 are only exemplary, and not exhaustive. The different members 130, 150 can have two male parts, two female parts, or some mix of them. Furthermore, a male part can either be of a magnetic or a ferromagnetic material. The same applies for a female part. It is also possible to have magnetic materials of different polarity for a male part, and a female part to be connected.

The invention is not limited to the described embodiments. It will be evident for those skilled in the art that many different modifications are feasible within the scope of the following Claims.

The invention claimed is:

1. A collapsible, flexible display system operable to create different spatial shapes of a continuous screen, said display system comprising at least two stands, each stand comprising a first part which supports against an underlying supportive surface, wherein said stand also comprises a pole, with a first end removably secured in said first part, and a second end provided with a first coupling, and that said display system also comprises essentially hollow, straight members of a rigid material, each straight member comprising a first end part and a second end part, wherein display system also comprises at least one essentially hollow, at least partly bendable members of a flexible material, each bendable member comprising a first end part and a second end part, wherein each of the end parts comprises either a male part, or a female part, at least one of them of a magnetic material, and operable to magnetically fasten to each other, wherein said straight members are connected to said bendable members in order to form an upper part and a lower part, both comprising a straight member and a bendable member, and if an end part of said bendable member comprises the female part, or the male part of said magnetic material, said end part of the bendable member comprises a sleeve arranged between said end part of said bendable member and said female part, or said male part, and wherein said screen comprises an upper edge welt and a lower edge welt adapted to receive said upper part and said lower part, respectively, and wherein each said pole is provided with a second coupling arranged in connection to said first end, wherein, when said display system is mounted, said upper edge welt comprising said upper part are fastened in a number, n, of first couplings, and said lower edge welt comprising said lower part are fastened in said number, n, of said second couplings.

2. The collapsible, flexible display system according to claim 1, wherein at least one of said at least partly bendable members has said first end part and said second end part provided with a female part, at least one of them being of magnetic material.

3. The collapsible, flexible display system according to claim 1, wherein at least one of said at least partly bendable members has said first end part provided with a female part, and said second end part provided with a male part, wherein at least one of said female part and said male part being of magnetic material.

4. The collapsible, flexible display system according to claim 1, wherein at least one of said at least partly bendable members has said first end part and said second end part provided with a male part, at least one of them being of magnetic material.

5. The collapsible, flexible display system according to claim 1, wherein at least one of said at least partly bendable members have at least one spring arranged in connection to said male part or said female part or to both said male part and said female part, inside said bendable member.

6. The collapsible, flexible display system according to claim 1, wherein at least one of said straight members has said first end part and said second end part provided with a female part, at least one of them being of a ferromagnetic material.

7. The collapsible, flexible display system according to claim 1, wherein at least one of said straight members has said first end part provided with a female part, and said second end part provided with a male part, wherein at least one of said female part and said male part being of ferromagnetic material.

8. The collapsible, flexible display system according to claim 1, wherein at least one of said straight members has said first end part and said second end part provided with a male part, at least one of them being of ferromagnetic material.

9. The collapsible, flexible display system according to claim 1, wherein each of said at least partly bendable members is made of rubber.

10. The collapsible, flexible display system according to claim 1, wherein at least one of said at least partly bendable members is provided with a stiff part and with at least one bendable end part.

11. The A collapsible, flexible display system according to claim 1, wherein at least one of said at least partly bendable members is provided with a central stiff part and with a first bendable end part and with a second bendable end part.

12. The collapsible, flexible display system according to claim 11, wherein the whole length of the at least partly bendable member is made of a flexible material, preferably rubber, having a stiffening device attached to the central part thereof.

13. The collapsible, flexible display system according to claim 12, wherein the stiffening device is mounted inside the central part of the bendable member, preferably arranged as a metal member, for example in the form of an aluminum tube.

14. The collapsible, flexible display system according to claim 12, the stiffening device is mounted outside the central part of the bendable member, preferably arranged as an outside mounted stiffening profile.

15. The collapsible, flexible display system according to claim 11, wherein the central stiff part is arranged as a stiff profile, preferably of metal, one end of which is connected to a first end member and the other end of which is connected to a second end member where both said end members are bendable.

16. The collapsible, flexible display system according to claim 15, wherein the connection between each end member and the central stiff part is arranged as an axially inserted linking member, preferably fixed with glue inside said members.

17. The collapsible, flexible display system according to claim 15, wherein each of said end members is made of rubber.

18. The collapsible, flexible display system according to claim 15, wherein said central stiff part is made of aluminum.

19. The collapsible, flexible display system according to claim 1, wherein each of said straight members is made of aluminum.

20. The collapsible, flexible display system according to claim 1, wherein said members have a circular cross section.

21. The collapsible, flexible display system according to claim 1, wherein said members have an elliptical cross section.

22. A collapsible, flexible display system operable to create different spatial shapes of a continuous screen, said display system comprising at least two stands, each stand comprising a first part which support against an underlying supportive surface, wherein said stand also comprises a pole, with a first end removably secured in said first part, and a second end provided with a first coupling, and wherein said display system comprises at least two essentially rectangular first screens, each first screen comprising two essentially hollow, straight members of a rigid material, one arranged in connection with a first short end of said first screen, and the other arranged in connection with a second short end of said first screen, each straight member comprising a first end part and a second end part, wherein each first screen comprises a first magnetic strip arranged in connection with a first longitudinal end of said first screen, and a second magnetic strip arranged in connection with a second longitudinal end of said first screen, wherein said display system also comprises at least one essentially rectangular second screen, each second screen comprises two essentially hollow, at least partly bendable members of a flexible material, one arranged in connection with a first short end of said second screen, and the other arranged in connection with a second short end of said second screen, each bendable member comprising a first end part and a second end part, each second screen comprising a first magnetic strip arranged in connection with a first longitudinal end of said second screen, and a second magnetic strip arranged in connection with a second longitudinal end of said second screen, wherein each of the end parts comprises either a male part, or a female part, at least one of them of a magnetic material, wherein said first and second screens are connected to each other by said straight and bendable members being connected to each other magnetically, and said magnetic strips being connected to each other magnetically, and said straight members are connected to said first coupling, and second coupling arranged in connection to said first end of each pole, creating a continuous screen.

* * * * *